March 29, 1932.　　　C. B. CLARK　　　1,851,273
PRODUCTION OF ANHYDROUS ALUMINUM CHLORIDE
Filed March 27, 1928
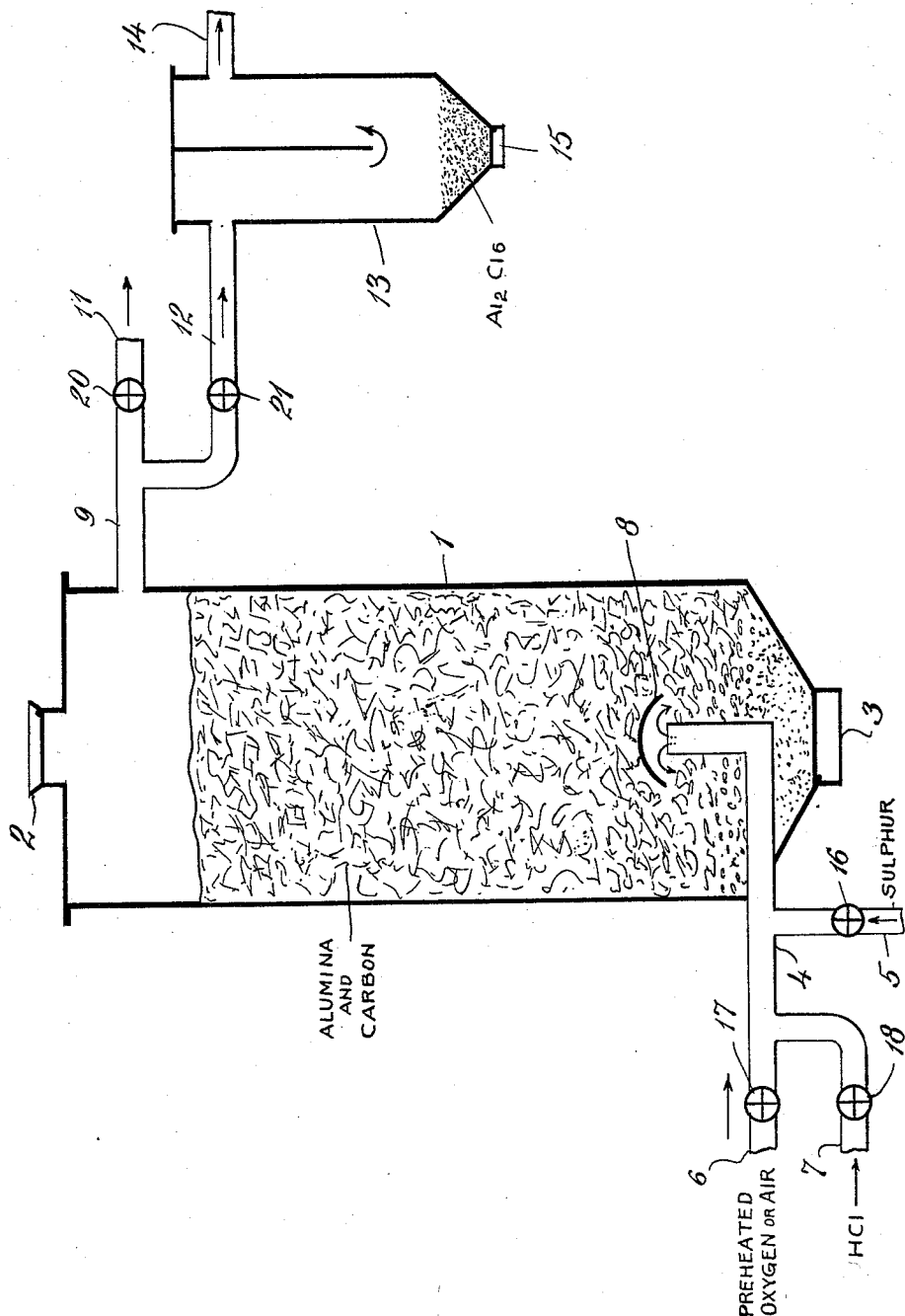
INVENTOR
CYRIL B. CLARK,
BY
ATTORNEY Patented Mar. 29, 1932

1,851,273

UNITED STATES PATENT OFFICE

CYRIL B. CLARK, OF SCARSDALE, NEW YORK, ASSIGNOR TO GENERAL CHEMICAL COMPANY, OF NEW YORK, N. Y., A CORPORATION OF NEW YORK

PRODUCTION OF ANHYDROUS ALUMINUM CHLORIDE

Application filed March 27, 1928. Serial No. 265,065.

My invention relates to the production of anhydrous aluminum chloride.

Anhydrous aluminum chloride is used very extensively in many industrial applications. It finds its widest use in carrying out Friedel-Crafts organic reactions and in the refining of petroleum, in which latter application it owes its value to its ability to convert unsaturated compounds to saturated compounds, to crack hydrocarbons, and to desulfurize the oil. While this material is at present used in considerable quantities, particularly in petroleum refining, its use would be much more extensive if it could be produced at a lower cost. Such an accomplishment, furthermore, would open up other fields of application, which at present are deterred from using aluminum chloride because of its present high cost.

The object of my invention is to provide an improved process which will permit the cheap and efficient production of anhydrous aluminum chloride.

As disclosed in my co-pending application, Serial #231,795 filed November 8, 1927, anhydrous aluminum chloride can be produced by reacting a charge comprising an alumina-bearing material and carbonaceous material with sulphurous material and hydrochloric acid gas under the influence of heat applied externally of the reaction chamber.

According to the present invention, anhydrous aluminum chloride is produced by reacting a charge comprising an alumina-bearing material and carbonaceous material with sulphurous material and hydrochloric acid gas under the influence of heat supplied within the mass of these reaction materials by the combustions a portion of the carbonaceous material contained in the charge with a supplemental supply of oxygen.

In the accompanying drawing I have shown diagrammatically one arrangement of apparatus for carrying out my invention.

Referring to the drawing, reference numeral 1 designates a reaction chamber of any suitable construction provided with the usual charge inlet 2 and spent charge outlet 3. A suitable distributing pipe 4 connecting with feed pipes 5, 6, and 7 enters the charge-containing chamber 1 at the bottom thereof for introducing the gaseous reaction materials thereinto. Distributing pipe 4 is provided with a hood 8 or is otherwise constructed to prevent clogging by the charge.

In the upper part of the chamber 1 an outlet pipe 9 is provided which connects with exhaust pipe 11 and delivery pipe 12. The delivery pipe 12 leads to a condenser 13 of any suitable type provided with the usual gas and condensed product outlets 14 and 15, respectively.

Suitable valves 16, 17, 18, 20, and 21 are provided respectively in the feed, exhaust, and delivery pipes 5, 6, 7, 11, and 12 for controlling the flow of gases therethrough.

In the preferred manner of carrying out the process of my invention, the alumina-bearing material and the carbonaceous material constitute the primary charge and into this charge the other reaction materials, viz.; gaseous sulfurous material and hydrochloric acid gas, are introduced, the heat necessary for initiating and maintaining the reaction being supplied by combustion with supplemental oxygen of a portion of the carbonaceous material in the charge, as explained more in detail hereinafter.

A charge is prepared comprising a suitable carbonaceous material, preferably a solid material such as coke, charcoal, or the like, and alumina-bearing material such as natural or artificial alumina, bauxite, the residual aluminum oxide resulting from the dehydration of the hydrous aluminum chloride resulting from petroleum refining, etc., which charge may be briquetted or otherwise treated to provide it in a suitable form. The amount of carbonaceous material provided in the charge should be appreciably in excess of the amount theoretically required for the combustion and aluminum chloride production operations described hereinafter. Preferably the charge is well dehydrated prior to introduction in to the furnace, although this may be accomplished in the furnace by blowing with oxygen or air as referred to hereinafter.

This charge is then introduced into the reaction chamber 1 through the charge inlet 2 until the chamber is charged to the desired depth.

The supplemental oxygen or air which is to be used for supplying heat by combustion of a portion of the carbon is preferably dried, for example by contact with sulfuric acid, and preferably preheated in any well-known manner, and is then blown into the reaction chamber through the feed pipe 6 and the distributing pipe 4. The passage of this combustion supporting material upwardly through the charge will result in the combustion of some of the carbon therein, mainly to CO, according to the equation:

$$2C + O_2 = 2CO$$

This reaction is accompanied by the evolution of a considerable amount of heat, and, in conjunction with preheating of the combustion supporting gas, will permit very high temperatures to be obtained in the charge. The blow will, moreover, effect a thorough dehydration of the charge, for such moisture as is present therein will be swept out in the gases or possibly decomposed as a result of the reducing action of the carbon at the high temperature then attained, according to the equation:

$$C + H_2O = CO + H_2$$

While it is conceivable that some $CO_2$ and $H_2O$ may be formed, particularly in the lower zone of the charge, their existence will be but transient, for the considerable excess of carbon in the chamber will result in the reduction of these oxidation products to $CO + H_2$ in the upper zone of the charge before they escape therefrom. The gaseous products of this operation are permitted to escape from the chamber through exhaust pipe 11, the valve 21 in pipe 12 being closed, and may be passed to the atmosphere or burned to supply heat for the air preheating operation previously noted. The blow is continued until a temperature intermediate 850° C. and 1350° C. is attained in the charge and then the air or oxygen supply is cut off. Preferably the temperature is brought up close to the upper limit of the temperature range specified.

After the termination of the oxygen or air blow, substantially dry hydrochloric acid gas is blown in through the feed pipe 7 and simultaneously therewith gaseous sulfur is blown in through the feed pipe 5, the two gaseous materials preferably then passing jointly into the reaction chamber as by means of the common distributing pipe 4. The proportion of hydrochloric acid gas to the sulfur introduced preferably should be in slight excess of the amount required for their joint action in the formation of aluminum chloride according to the theoretical equation noted hereinafter. This sulfur and hydrochloric acid are introduced more slowly than the air or oxygen in the preliminary blow in order to assure their thorough interaction with the hot charge, a rate of flow of the entering mixed gases of about 20 cu. ft. per hour per cu. ft. of charge (calculated at standard conditions of temperature and pressure) having been found satisfactory.

The reaction which takes place is probably best indicated by the theoretical equation:

$$Al_2O_3 + 3C + 3S + 6HCl = 2AlCl_3 + 3H_2S + 3CO$$

This reaction proceeds best between 850° C. and 1350° C. The reaction is somewhat endothermic in nature and the original heat furnished by the carbon combustion will be gradually absorbed. The temperature of the charge should not be permitted to fall below 850° C., and preferably should be maintained appreciably above that temperature, for example at 1150° C. The gaseous products of the combined reaction of the sulfur and hydrochloric acid, viz: $AlCl_3$, $H_2S$, HCl, CO, $CS_2$, etc., pass off through the outlet 9 whence they are delivered by pipe 12, the valve 20 in pipe 11 being closed, to the condenser 13 where the gases are cooled and the $Al_2Cl_6$ collected, the $H_2S$, HCl, CO, $CS_2$, etc., passing off through the outlet 14.

The proportions of the reaction materials introduced into the furnace, i. e., the proportion of carbon to alumina in the charge, and the proportion of hydrochloric acid to sulfur in the entering gases, should be regulated to provide amounts of each present in the furnace during the hydrochloric acid-sulfur blow sufficient to satisfy the equation just given, together with an excess of carbon and of hydrochloric acid as previously noted. In view of the fact that a considerable amount of carbon will be used up during the progress of the oxygen or air blow, it will, of course, be necessary to provide an initial proportion of carbon to alumina in the charge sufficiently in excess of the amount required to satisfy the equation, to provide for the considerable amount of carbon thus utilized in the oxygen or air blow to supply heat, as well as for the amount of carbon diverted to side reactions. The exact proportion of carbon most favorable for a given installation will vary, of course, with the nature of the furnace, amount of radiation, extent of preheating of the air, etc., but can readily be determined in practice by observing the content of unutilized carbon and undecomposed alumina in the spent charge.

When the temperature in the furnace evidences reduction below the proper point, the introduction of sulfur and hydrochloric acid gas should be temporarily suspended and hot oxygen or air blown in to bring the temperature up again. If desired, hydrochloric acid gas may be blown through the charge prior to the recuperative oxygen or air blow to sweep out to the condensers any remaining gaseous products of the aluminum chloride reaction.

In place of the sulfur the gaseous sulfurous material may be supplied either as carbon bisulfide or as sulfur dioxide, as explained in greater detail in my earlier application referred to above.

The reactions which take place with these materials are probably best indicated by the theoretical equations:

$$2Al_2O_3 + 3C + 3CS_2 + 12HCl = 4AlCl_3 + 6CO + 6H_2S$$
$$Al_2O_3 + 9C + 3SO_2 + 6HCl = 2AlCl_3 + 9CO + 3H_2S$$

The procedure when these materials are used is substantially the same as in the case of sulphur, with such alterations in amounts of materials, etc., as will be apparent to one skilled in the art.

My invention also contemplates the introduction of the oxygen or air continuously along with the other gaseous reaction materials. For example, when using sulfur as the source of the sulfurous material, the hot supplemental oxygen, gaseous sulfur, and a small excess of substantially dry hydrochloric acid gas may all be blown into the reaction chamber together. In this operation I prefer to introduce the oxygen in the form of relatively pure oxygen rather than air in order to prevent undue dilution of the reaction products with nitrogen and to permit the more ready attainment of the high temperature required. The supply of the combustion supporting gas, viz: the pure oxygen, is so regulated as to maintain the temperature of the charge intermediate 850° C. and 1350° C., a temperature approximately midway between these two points being suitable, and the reaction is permitted to proceed until anhydrous aluminum chloride ceases to evolve in appreciable quantity.

The exact mechanism of the chemical reaction which results in the formation of aluminum chloride in the continuous operation is difficult to ascertain, but it is probable that the reaction indicated by the equation previously referred to, i. e., $$Al_2O_3 + 3C + 3S + 6HCl = 2AlCl_3 + 3CO + 3H_2S$$

is responsible for the greater proportion of the anhydrous aluminum chloride formed.

The carbon in the chamber is oxidized mainly to CO and such amount of carbon as is oxidized to $CO_2$ in the lower reaction zone is probably reduced to CO by the excess carbon in the upper reducing zone. This combined carbon reaction is strongly exothermic in nature and, in conjunction with the preheated oxygen or air, furnishes the heat necessary to carry on the reaction.

When the strongly preheated air or oxygen is introduced together with the sulfur, the sulfur will be oxidized to $SO_2$ in appreciable quantities. Such conversion of the sulfur to $SO_2$, however, prior to its introduction into contact with the charge, has no appreciable detrimental effect upon the production of anhydrous aluminum chloride, for the $SO_2$ formed will be reduced to sulfur again by the excess carbon in the charge, the combined reaction being indicated by the equation:

$$Al_2O_3 + 9C + 3S + 3O_2 + 6HCl = 2AlCl_3 + 9CO + 3H_2S$$

Hence the formation and subsequent decomposition of the $SO_2$ may be ignored insofar as the amount of heat generated is concerned, and the reaction may be considered solely as an oxidation of a portion of the carbon of the charge by the supplemental oxygen introduced, the available heat generated being the heat of formation of the CO from carbon and oxygen. The quantity of supplemental oxygen introduced over that which may combine with the S will of course oxidize the carbon to CO as above explained, thereby generating the remainder of the heat required to maintain the necessary high temperature for the reaction.

The use of carbon bisulfide in the continuous operation will result in substantially the same basic reactions taking place in the hot charge as in the case of sulphur, except that an additional amount of carbon is provided by the carbon bisulfide, thus permitting a corresponding reduction in the amount of carbon supplied in the charge. The introduction of this $CS_2$ with the preheated air or oxygen will result in the formation of considerable quantities of $CO_2$ and $SO_2$ according to the equation:

$$CS_2 + 3O_2 = CO_2 + 2SO_2$$

This oxidation, however, will not affect the major reaction detrimentally for in the presence of the considerable excess of carbon in the charge the anhydrous aluminum chloride will be produced whether the sulfurous material is in the form of sulfur, sulfur dioxide, or carbon bisulfide. This oxidation of $CS_2$ upon its introduction, will moreover result in the evolution of a considerable quantity of heat which will serve to aid the attainment of the thermal conditions desired in the charge and in the entering gases.

If desired, the oxygen or air in the continuous operation may be introduced into the charge separately from the sulfur or carbon bisulfide rather than through a common inlet, whereby preliminary oxidation of the sulfur or carbon bisulfide will be to some extent avoided.

In any event, the final or net result of the introduction of supplemental oxygen into the charge will be the combustion of a portion of the carbon of the charge to CO, as previously explained, irrespective of the exact nature of the various intermediate reactions which may occur in the formation of the anhydrous chloride.

When $SO_2$ is utilized primarily as the sulfurous material, the reactions in the charge will be along the same lines as in the previous cases, except that proportionately larger amounts of carbon will have to be available in the charge to provide the necessary heat by combustion. The major reaction will be:

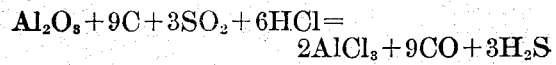
$$Al_2O_3 + 9C + 3SO_2 + 6HCl = 2AlCl_3 + 9CO + 3H_2S$$

The gaseous products from the continuous operation are all passed through delivery pipe 12 and into the condenser 13 where the $Al_2Cl_6$ is collected.

In the continuous operation it is preferable to first blow air or oxygen alone, through the charge until a temperature intermediate 850° C. and 1350° C. is obtained, and then to introduce the oxygen, sulfurous material and hydrochloric acid gas simultaneously, as noted. In this fashion sufficient heat is provided to initiate the reaction properly without the waste of any of the gaseous reaction materials in so doing.

It will be apparent from the foregoing that I have provided a method of producing anhydrous aluminum chloride which is easily and efficiently carried out. The raw materials involved in the reaction are readily available and comparatively cheap in price, the manner in which heat is provided and utilized is very efficient and involves but little expense, and a very satisfactory product is obtained.

I claim as my invention:

1. The process of manufacturing anhydrous aluminum chloride which comprises reacting alumina-bearing material, carbonaceous material, sulfurous material, and hydrochloric acid gas, said carbonaceous material being considerably in excess of the theoretical amount required for the reaction and carrying out said reaction under the influence of heat provided by combustion within the mass of said reaction materials of a portion of said carbonaceous material with supplemental oxygen.

2. The process of manufacturing anhydrous aluminum chloride which comprises reacting alumina-bearing material, carbonaceous material, sulfurous material, and hydrochloric acid gas, said carbonaceous material being considerably in excess of the theoretical amount required for the reaction and carrying out said reaction under the influence of heat provided by intermittent combustion within the mass of said reaction materials of a portion of said carbonaceous material with supplemental oxygen.

3. The process of manufacturing anhydrous aluminum chloride which comprises reacting alumina-bearing material, carbonaceous material, sulfurous material, and hydrochloric acid gas, said carbonaceous material being considerably in excess of the theoretical amount required for the reaction and carrying out said reaction under the influence of heat provided by continuous combustion within the mass of said reaction materials of a portion of said carbonaceous material with supplemental oxygen.

4. The process of manufacturing anhydrous aluminum chloride under the influence of heat which comprises contacting alumina-bearing material, carbonaceous material, sulfurous material and hydrochloric acid gas, said alumina-bearing material, sulfurous material, and hydrochloric acid gas being substantially in reacting proportions to form anhydrous aluminum chloride and said carbonaceous material being considerably in excess of its reacting proportion, and contacting supplemental oxygen with the mass of said materials in quantity sufficient to heat said materials to a temperature intermediate 850° C. and 1350° C. by the combustion of a portion of said carbonaceous material, whereby anhydrous aluminum chloride is formed.

5. The process of manufacturing anhydrous aluminum chloride which comprises reacting alumina-bearing material, carbonaceous material, sulfurous material, and hydrochloric acid gas, said carbonaceous material being considerably in excess of the theoretical amount required for the reaction, carrying out said reaction at a temperature intermediate 850° C. and 1350° C., and maintaining said temperature by combustion within the mass of said reaction materials of a portion of said carbonaceous material with supplemental oxygen.

6. The process of manufacturing anhydrous aluminum chloride which comprises reacting alumina-bearing material, carbonaceous material, sulfurous material, and hydrochloric acid gas, said carbonaceous material being considerably in excess of the theoretical amount required for the reaction, carrying out said reaction at a temperature intermediate 850° C. and 1350° C., and maintaining said temperature by intermittent combustion within the mass of said reaction materials of a portion of said carbonaceous material with supplemental oxygen.

7. The process of manufacturing anhydrous aluminum chloride which comprises reacting alumina-bearing material, carbonaceous material, sulfurous material, and hydrochloric acid gas, said carbonaceous material being considerably in excess of the theoretical amount required for the reaction, carrying out said reaction at a temperature intermediate 850° C. and 1350° C., and maintaining said temperature by continuous combustion within the mass of said reaction materials of a portion of said carbonaceous material with supplemental oxygen.

8. The process of manufacturing anhydrous aluminum chloride which comprises preparing a charge comprising alumina-bearing material and an amount of carbonaceous material in excess of the theoretical amount required for the reaction, blowing oxygen into contact with said charge to burn a portion of the carbonaceous material therein to heat the charge to a point where anhydrous aluminum chloride will be formed by the interaction with said hot charge of sulfurous material and hydrochloric acid gas, and then introducing sulfurous material and hydrochloric acid gas simultaneously into said charge to form anhydrous aluminum chloride.

9. The process of manufacturing anhydrous aluminum chloride which comprises preparing a charge comprising alumina-bearing material and an amount of carbonaceous material in excess of the theoretical amount required for the reaction, introducing an oxidizing combustion supporting material into said charge to obtain a temperature intermediate 850° C. and 1350° C. by the combustion of a portion of the said carbonaceous material therein, and then introducing sulfurous material and hydrochloric acid gas simultaneously into the heated charge to form anhydrous aluminum chloride.

10. The process of manufacturing anhydrous aluminum chloride which comprises preparing a charge comprising alumina-bearing material and an amount of solid carbon, blowing oxygen into contact with said charge to obtain a temperature intermediate 850 ° C. and 1350° C. by the combustion of a portion of the carbon in said charge, and passing gaseous sulfurous material and hydrochloric acid gas simultaneously in contact with the heated charge to form anhydrous aluminum chloride.

11. The process of manufacturing anhydrous aluminum chloride which comprises preparing a charge comprising alumina-bearing material and an amount of solid carbon in excess of the theoretical amount required for reaction, blowing oxygen into contact with said charge to obtain a temperature intermediate 850° C. and 1350° C. by the combustion of a portion of the carbon in said charge, and passing gaseous sulfur and hydrochloric acid gas simultaneously in contact with the heated charge to form anhydrous aluminum chloride.

12. The process of manufacturing anhydrous aluminum chloride which comprises preparing a charge comprising alumina-bearing material and an amount of carbonaceous material in excess of the theoretical amount required for the reaction, blowing hot oxygen into contact with said charge to obtain a temperature in said charge intermediate 850° C. and 1350° C. by the combustion of a portion of the carbonaceous material therein, then reacting sulfurous material and hydrochloric acid gas with the heated charge whereby anhydrous aluminum chloride is formed and repeating said blowing operation at intervals to maintain the temperature of the reaction materials intermediate 850° C. and 1350° C.

13. The process of manufacturing anhydrous aluminum chloride under the influence of heat which comprises preparing a charge comprising alumina-bearing material and an amount of solid carbon in excess of the theoretical amount required for the reaction, then passing relatively pure oxygen, sulfurous material, and hydrochloric acid gas simultaneously in contact with said charge in suitable proportions to produce anhydrous aluminum chloride and to maintain a temperature in said charge intermediate 850° C. and 1350° C.

14. The process of manufacturing anhydrous aluminum chloride under the influence of heat which comprises preparing a charge comprising alumina-bearing material and an amount of solid carbon in excess of the theoretical amount required for the reaction, then passing relatively pure oxygen, sulfur and hydrochloric acid gas simultaneously in contact with said charge in suitable proportions to produce anhydrous aluminum chloride and to maintain a temperature in said charge intermediate 850° C. and 1350° C.

15. The process of manufacturing anhydrous aluminum chloride under the influence of heat which comprises preparing a charge comprising alumina-bearing material and an amount of carbonaceous material in excess of the theoretical amount required for reaction, blowing oxygen into contact with said charge to obtain a temperature intermediate 850° C. and 1350° C. by the combustion of a portion of said carbonaceous material, and then passing relatively pure oxygen, sulfurous material, and hydrochloric acid gas continuously in contact with said charge in suitable proportions to produce anhydrous aluminum chloride and to maintain the temperature in said charge intermediate 850° C. and 1350° C.

In witness whereof I have hereunto set my hand.

Signed at the city of New York, N. Y., this 21st day of March, 1928.

CYRIL B. CLARK.

CERTIFICATE OF CORRECTION.

Patent No. 1,851,273. Granted March 29, 1932, to

CYRIL B. CLARK.

It is hereby certified that error appears in the printed specification of the above numbered patent requiring correction as follows: Page 5, line 36, claim 10, after the word "carbon" insert the words in excess of the theoretical amount required for the reaction, and lines 50 and 104, claims 11 and 15, respectively, before the word "reaction" insert the article the; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.